United States Patent [19]

Radcliffe

[11] Patent Number: 4,832,241
[45] Date of Patent: May 23, 1989

[54] VEHICLE PORTABLE-OFFICE ORGANIZER

[76] Inventor: Denise E. Radcliffe, 1022 N. Kankakee St., Lincoln, Ill. 62656

[21] Appl. No.: 50,422

[22] Filed: May 18, 1987

[51] Int. Cl.⁴ .......................... B60R 7/00; B60R 7/04
[52] U.S. Cl. .................... 224/275; 224/42.42; 108/44; 296/37.15
[58] Field of Search ............... 220/22.3; 217/7, 21; 224/275, 277, 279, 273, 42.42, 42.45 R, 42.46 R; 108/44; 296/37.1, 37.8, 37.15, 37.16

[56] References Cited

U.S. PATENT DOCUMENTS

| | | | |
|---|---|---|---|
| 1,926,162 | 9/1933 | Moberly | 217/7 |
| 2,061,965 | 11/1936 | Graeser | 220/22.3 X |
| 2,633,180 | 3/1953 | Reed | 224/275 X |
| 2,692,638 | 10/1954 | Castell | 224/275 X |
| 2,695,112 | 11/1954 | Bonnevay | 220/22.3 |
| 2,934,391 | 4/1960 | Bohnett | 108/44 X |
| 2,985,333 | 5/1961 | Kirkman | 220/22.3 |
| 3,032,381 | 5/1962 | Boro | 217/7 |
| 3,089,583 | 5/1963 | White | 224/277 X |
| 3,163,287 | 12/1964 | Barnett | 224/42.42 R X |
| 3,338,629 | 8/1969 | Drees | 224/275 X |
| 3,632,158 | 1/1972 | Boothe | 296/37.8 |
| 3,670,936 | 6/1972 | Pronovost et al. | 224/42.42 R |
| 3,922,973 | 12/1975 | Sturgeon | 108/44 X |
| 4,146,159 | 3/1979 | Hemmen | 224/275 |
| 4,261,465 | 4/1981 | Thomas | 220/22.3 X |
| 4,417,764 | 11/1983 | Marcus et al. | 108/44 X |
| 4,446,966 | 5/1984 | Moloney | 217/7 |
| 4,512,503 | 4/1985 | Gioso | 224/42.42 R |

FOREIGN PATENT DOCUMENTS 5414 of 1904 United Kingdom ................... 217/7

Primary Examiner—Ernest G. Cusick
Attorney, Agent, or Firm—Albert O. Cota

[57] ABSTRACT

A vehicle portable-office organizer (10) designed to be detachably mounted to the passenger seat of a vehicle. The organizer (10) consists of a tray (12) sized to accept a tray insert (14) that can be divided into a selectable quantity of smaller trays by dividers selected from a divider set (16). On the front of the tray (12) is attached a cradle (18) that allows a briefcase to be stowed during travel. On the back of the tray (12) there is a seat slip-plate (20) that retains the organizer in place. On the back section of the tray insert (14) is located an extended vertical container (24). This container may be designed with two compartments or a plurality of dividers that allow several forms to be easily stowed and retrieved. A cover/writing table (26) is also included that when placed on top of the tray serves as a cover or as a writing surface. When the table is not in use, it is inserted into a longitudinal slot (12g) for storage below the tray.

4 Claims, 3 Drawing Sheets

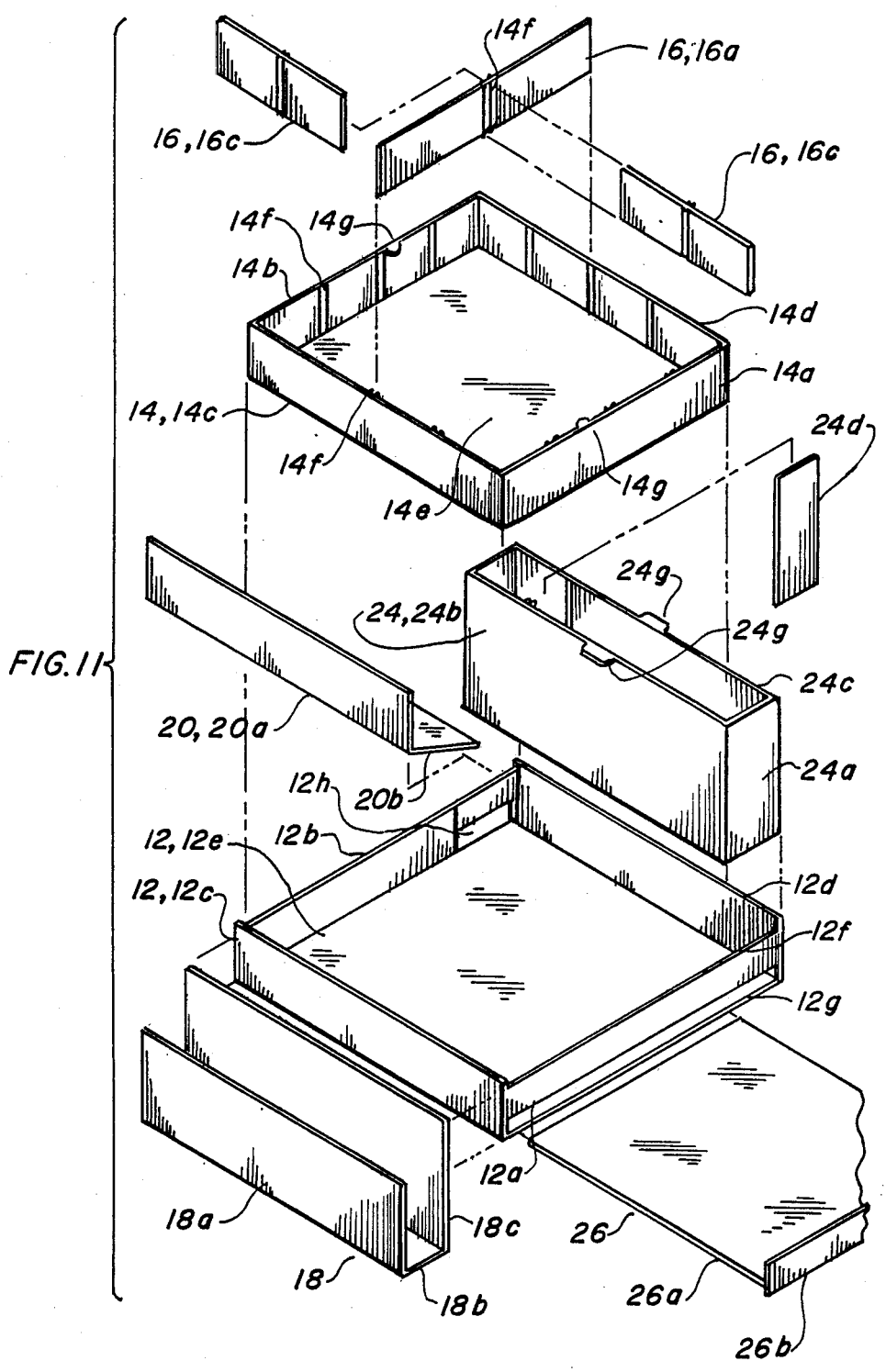

VEHICLE PORTABLE-OFFICE ORGANIZER

TECHNICAL FIELD

The invention pertains to the general field of desk and drawer organizers and more particularly to such an organizer that is designed to be easily attached and detached from the passenger seat of a vehicle.

BACKGROUND ART

There are many business persons and especially traveling salespersons that utilize their vehicle as a "portable office". These persons have long had the problem of storing and easily retrieving office implements such as ordering books, displays and advertising literature, forms and other stationery supplies that are used on a daily basis. This problem is further compounded by sales persons that must service a large number of accounts. In addition to supply storage and retrieval, a handy and ample writing surface is usually not conveniently available to review/prepare business documents and to make business notations.

The most common method used by sales and business persons to store and retrieve supplies is to keep them in their briefcase or to maintain a "pentaflex" type file system usually kept in the trunk or the floor of the vehicle. This method has its drawbacks since the supplies are not easily visible or readily retrieved. During inclement weather, the problem is further amplified since, in many cases, the person must leave the vehicle to reach the required supplies.

The ability to organize office implements and to have a method and system that allows quick and easy supply storage and retrieval is both cost-effective and time-efficient.

A search of the prior art did not disclose any patents that read directly on the claims of the instant invention however, the following U.S. patents were considered related:

| U.S. Pat. No. | INVENTOR | ISSUED |
| --- | --- | --- |
| 3,632,158 | Boothe | 4 January 1972 |
| 3,345,118 | Cummings | 3 October 1967 |
| 3,232,250 | Hamilton, et al | 1 February 1966 |
| 2,934,391 | Bohnett | 26 April 1960 |

The Boothe patent discloses a console designed to be placed on top of a vehicle seat without the need for installation holes or the leaving of permanent marks. The console features an area to house and connect electronic communications equipment and includes a compartment suitable for storing papers, books pads and the like. The lid of the console also serves as a writing surface. The console is secured to the slot at the front and at the rear. At the bottom-rear section of the console there is a lip portion that extends outwardly and between the seat back and the seat. At the bottom-front of the console there is secured a rigid bracket that extends downwardly and rearwardly and engages the bottom of the vehicle seat.

The Cummings patent discloses a desk designed to be fitted inside the front seat of an automobile. The desk includes a storage compartment that features a set of drawers and a hinged desk top that serves as a cover for the compartment and as a writing surface. The desk top has a front edge to which are attached a set of clips. The clips may be used to secure a writing paper, a road map or the like to the top of the desk. The desk is supported by the front portion of the seat and by a U-shaped bracket located on the bottom of the desk. The bracket is contoured to fit over the center drive shaft hump of the automobile.

The Hamilton patent discloses an automobile desk that can be detachably mounted in any desired position along the width of an automobile seat and back. The desk has a generally rectangular panel that is bordered by a frame. At the rear of the frame are located a pair of brackets that have attached at each end a U-shaped hook. The hooks as contoured to be placed over the back of the automobile seat. On the underside of the panel there is hinged leg that when extended rests on the top of the automobile seat. A clip and pencil holder is mounted to the upper front edge of the frame to allow papers to be secured to the panel. The panel also includes a slidable cup holder that is attached to the side of the frame.

The Bohnett patent discloses a structure that includes a desk with a writing surface and a file storage section. The structure is shaped so that it can be fitted into the center of an automobile benchtype seat. Legs are provided that are adjusted to allow the structure to properly fit the seat and dispose the desk top at a suitable work level. The desk is stabilized by the car seat and the floor of the automobile. If desired, a pad clip can be seucred to the top of the desk area to secure papers so that only one hand is required for writing.

DISCLOSURE OF THE INVENTION

The vehicle portable-office organizer is designed to be easily attached and detached from the passenger seat of an automobile or other vehicles. The organizer provides sales persons and other business persons, that of necessity must use their automobile as an office, with an easy storage and retrieval of forms, books, sales and promotional literature and office supplies that are used on a daily basis to service accounts. The organizer also contains and prevents these items from leaving the seat area in the event of a sudden vehicle stop.

The organizer consists of a base tray configured to fit on top of a vehicle passenger seat and to accept a tray insert. The insert can be selectively partitioned into a number of smaller trays by inserting dividers selected from a divider set. Attached to the front of the tray, is a cradle that allows a briefcase or other papers and supplies carrying structural to be stowed. when not in use, in an upright position and to be easily removed when needed. On the back of the tray, is located a seat slipplate that is inserted between the seat back and seat to hold the organizer in place. Two other supplemental methods are provided to hold the organizer in place: a seat belt may be inserted through a set of slots in the tray, or a set of resilient strays with a hook on one end may be attached to the organizer. One of these straps is attached to the inside front section of the tray and the other is attached to the external side of the slip plate. In both cases, the hooks are hooked to the understructure of the seat.

The organizer also includes an extended vertical container and a cover/writing table.

The container may be made in two configurations: in one, it is divided into two side compartments where one of the compartments is sized to accept larger books such as a bound map book; in the other, the container has a plurality of dividers. These dividers are used for storing and retrieving larger flat documents and forms.

The cover/writing table includes a flat surface having a pull tab on one side. The flat surface is sized to fit on top of the tray to serve as both a cover, to prevent contamination of the supplies, and as a large writing and and planning surface. When not in use, the table is inserted completely into a longitudinal slot located on the side of the tray.

In view of the above description, it is the primary object of the invention to provide an assembly and method that allows various types of forms and other types of office supplies to be easily and orderly stored and contained on the passenger seat of an automobile ready for immediate use by salespersons and other persons that spend a great deal of time in their automobile.

It is also an object of the invention to provide an organizer that can be individually partitioned and customized to suit the requirements of a specific individual.

In addition to the above, it is also an object of the invention to provide an assembly that:

is aesthetically designed,
is cost-effective to manufacture,
is durable and maintenance free,
will save time for the user, and
can be attached and detached from an automobile seat without any installation holes or any modification to the seat.

These and other objects and advantages of the present invention will become apparent from the subsequent detailed description of the preferred and second embodiment and the appended claims taken in conjunction with the accompanying drawings.

BRIEF DESCRIPTION OF THE DRAWINGS

FIG. 11 is an exploded view showing the various elements that comprise the organizer.

DETAILED DESCRIPTION OF THE PREFERRED EMBODIMENT

Figure 1:
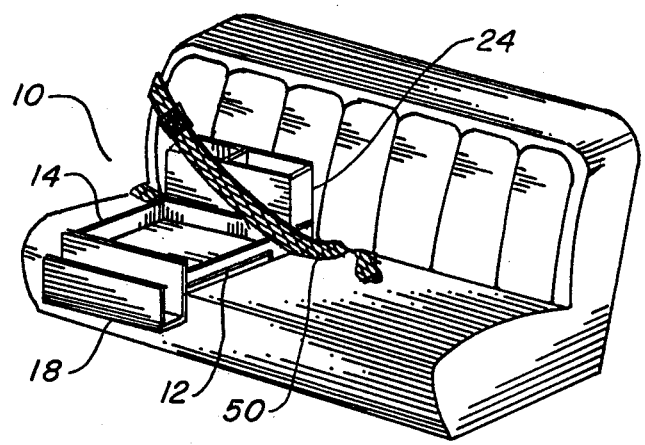
FIG. 1 is a frontal perspective view showing the vehicle portable-office organizer attached to a vehicle seat.

The best mode for carrying out the vehicle portable-office organizer 10 is presented in terms of a preferred embodiment that is designed to be easily attached and detached to a vehicle seat. The organizer provides salespersons and others with a method for storing containing and retrieving often used forms, books and other office supplies and prevents these items from leaving the seat area if a sudden stop should occur.

The preferred embodiment, as shown in FIGS. 1 through 11 is comprised of the following eight major elements: a tray 12, a tray insert 14, a divider set 16, a cradle 18, a seat slip-plate 20, a set of organizer attachment straps 22, an extended vertical container 24 and a cover/writing table 26.

Figure 2:
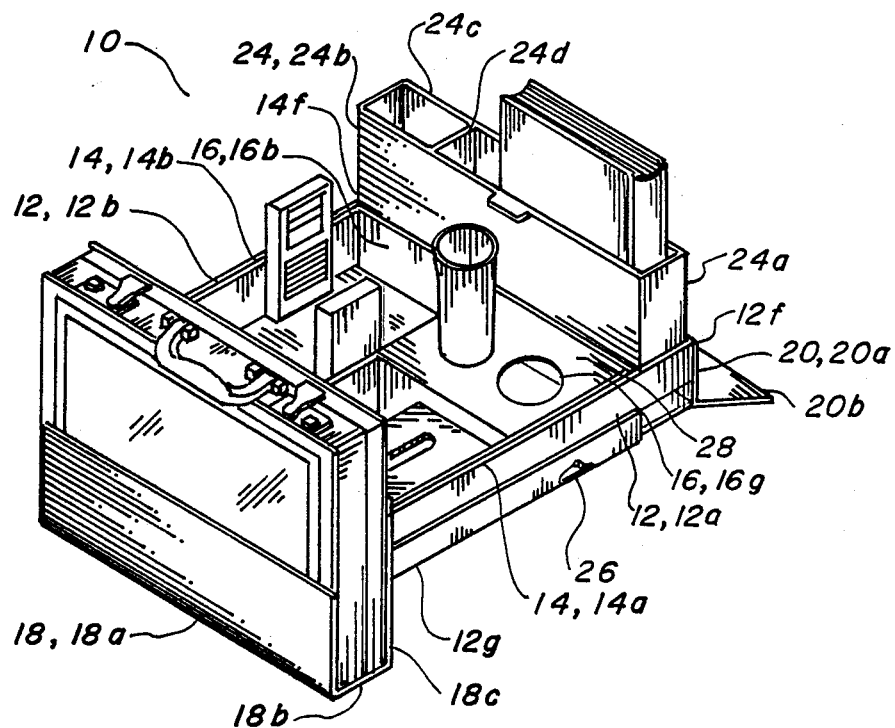
FIG. 2 is a frontal perspective view of the organizer containing a variety of office implements including a briefcase.

The tray 12 as best shown in FIGS. 2 and 11 is in a rectangular shape such that when viewed from the top, the top perimeter dimension of the tray is sized to fit within the top of a vehicle passenger seat.

The rectangular shape includes an inboard side section 12a, that is, the side facing the driver, an outboard side 12b, a front section 12c, a back section 12d and a bottom section 12e. In the manufacturing process, the tray is made so that all the sections are contiguous and is constructed as are all the other elements of the organizer of a plastic material. Although other materials may be used, plastic is preferred.

In the preferred embodiment, the cradle 18 and the slip-plate 20 are individual elements that are subsequently attached to the tray 12. The organizer 10 may also be designed with a single molded element that includes the cradle 18 and/or the slip-plate 20.

The tray is designed with the height of the side sections 12a, 12b being slightly less than the height of the front and back sections 12c, 12d. This height difference is approximately ¼ inch (0.64 cm). Therefore, when viewed from the side, as best shown in FIGURE 11, the side sections at the intersection with the front section 12c step down and at the intersection with the back section 12d they have a step up thus forming a longitudinal channel 12f.

In the preferred embodiment, the tray 12 has a longitudinal slot 12g on its inboard side section 14a and a seat belt slot 12h on its outboard side section. The longitudinal slot extends along the lower edge of the section as shown best in FIG. 11 while the seat belt slot 12h is located near the lower back corner of the section as also shown in FIG. 11. The longitudinal slot in combination with the seat belt slot functions to allow a seat belt 50 to be slipped between the lower side of the inserts bottom section 14e and the upper side of the trays bottom section 12e. The seat belt 50 allows the organizer 10 to be held firmly in place on the vehicle seat. The longitudinal slot 12g also functions to allows the cover/writing table 26, described infra, to be inserted and stowed.

The tray insert 14, as shown in FIGS. 2–8 and 11 is also in a rectangular shape having perimeter and height dimensions that allow the insert to slideably fit inside the tray 12 at a height that is on the level with the plane of the longitudinal channel 12f. The tray insert includes an inboard side section 14a, an outboard side section 14b, a front section 14c, a back section 14d and a bottom section 14e where all sections are respectively contiguous.

In the preferred embodiment, the front and back sections 14c, 14d have on their inside surface three vertical grooves 14f. One of the grooves is centered while the other two are centered between the center groove and the respective side sections 14a, 14b. The two side sections 14a, 14b have on each of their upper edges a lift tab 14g as best shown in FIG. 11 and also each have on their inside surface three vertical grooves 14f. The first groove is centered and the second groove is centered between the center groove and the front section 14c. The third groove is located approximately 4.0 inches (10.25 cm) from the back section 14d. This third groove holds a divider that is used to hold the extended vertical container 24 described infra. The set of grooves allow the seat of dividers, next described to be inserted to partition the insert 14 into a selectable quantity of smaller trays. The insert, however, may also be used without any dividers as shown in FIG. 1.

The divider set 16 consists, in the preferred embodiment, of four basic dividers and a fifth supplemental divider. Each of the dividers has a height equal to the height of the tray insert 14 and a groove on each of its sides. These oppositely located grooves are offset from one another as best shown in FIG. 11, to maintain the structural integrity of the dividers.

Figure 3:
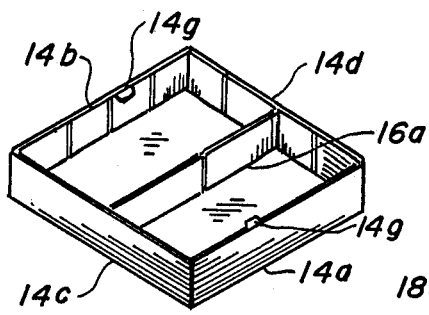
FIG. 3 is a perspective view of the tray insert with a first divider installed.
Figure 5:
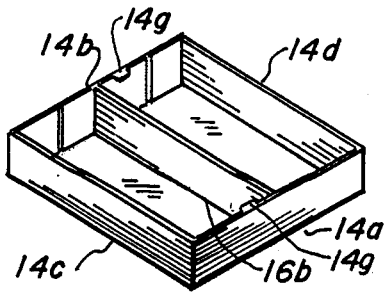
FIG. 5 is a perspective view of the tray insert with a second divider installed.
Figure 7:
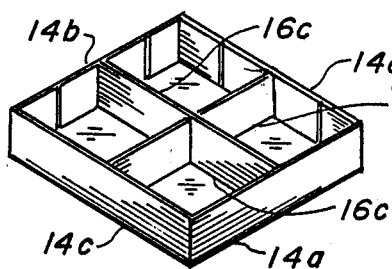
FIG. 7 is a perspective view of the tray insert with a first divider and a pair of third dividers installed.

The first divider 16a, as best shown in FIG. 3 is sized to fit along the length of the tray be inserting the tray into the vertical grooves 14f on the front and back sections 14c, 14d of the tray insert 14. The second divider 16b, as shown in FIG. 5 is sized to fit along the width of the tray and is inserted into the set of grooves 14f located on the two side sections 14a, 14b. The third divider 16c, as shown in FIG. 7, is sized to fit into the two offset grooves 14f located on the first divider 16a and the groove 14f on the respective side section 14a, 14b. The fourth divider 16d is sized to fit into the two offset grooves 14f located on the second divider 16b and the respective groove 14f on either the front section 14c or back section 14d. The basic divider set 16 allow the tray insert to be divided into four equal trays as shown best in FIG. 7. Additionally, by having offset grooves centered on the third and fourth dividers 16c, 16d still smaller trays 16f can be constructed as shown in FIG. 8.

Figure 8:
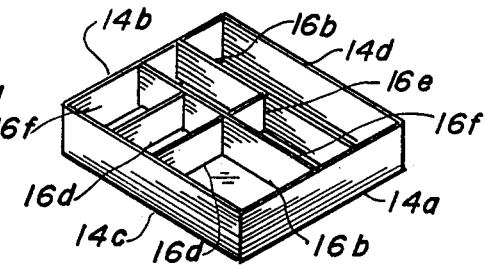
FIG. 8 is a perspective view of the tray insert with a plurality of dividers installed.

The fifth divider 16e, as shown in FIG. 8, is sized to fit between a divider 16b that is inserted into the previously mentioned third groove, located approximately 4.0 inches (10.25 cm) from the inserts back section 14d and a second divider 16b centrally located on the tray. The tray section created by the fifth divider, as well as other tray sections can be used to support a tray overlay 28. The tray overlay can be made with downwardly sloping corners that fit and hold the overlay over two sides of a smaller tray 16f. One such tray, as shown in FIG. 2, has a set of cup bores 16g that allow filled cups to be inserted and held in place.

The organizer also features a cradle 18 that allows a briefcase, an accordian type folder or other paper and supplies carrying structures to be easily and conveniently stowed while traveling. The cradle, as shown best in FIGS. 2 and 11, has a front section 18a, a bottom section 18b and a back section 18c. The width of these sections is the same as the width of the tray 12. In the preferred embodiment, the cradle is manufactured in one contiguous piece in a J-shape as viewed from the side. The back of the cradles front section is attached to the front of the trays front section 12c. The attachment may be accomplished by a number of conventional attachment means such as an adhesive or a plurality of flush rivets.

Figure 6:
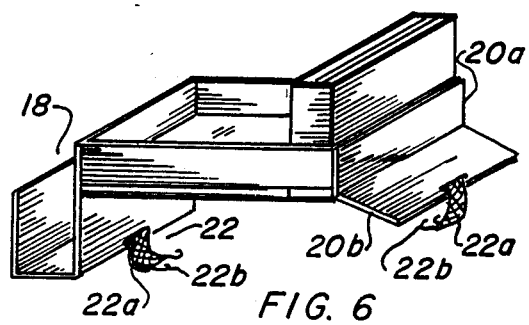
FIG. 6 is a back perspective view of the organizer showing the location of the attachment straps and a second configuration of the extended vertical container.

In addition to using the vehicle seat belt to hold the organizer, as described supra, several other holding methods are also available. One of these methods is to simply wrap the shoulder belt around the extended vertical section 24. Another holder is the seat slip-plate 20 which can be used singularly or in combination with the seat belt and/or the shoulder belt. The seat plate, as shown in FIGS. 6 and 11, has a vertical section 20a and a contiguous downwardly sloping section 20b. The sloping section is angled downwardly at approximately 30 degrees from the horizontal and slips between the seat and the bottom of the seat back to keep the organizer 10 in place. The sloping section may also be curved downwardly to conform to the contour of the seat. In lieu of the slip-plate, a resilient, section articulated belt can be conventionally attached to the back section 12d. After the belt is inserted between the intersection of seat and seat back, the articulated section nearest the intersection is rotated by 90-degrees to hold the belt in place.

The seat slip-plate 20 is attached to the tray by attaching the back of vertical section 20a to the front of the trays back section 12d. The attachment means may also be by an adhesive or a plurality of flush rivets.

To provide additional holding power, a set of organizer attachment straps 22 may also be utilized. These straps as shown in FIG. 6, consists of a resilient strap 22a having attached on one end a hook 22b. The non-hook end of one of the straps is conventionally attached, such as by rivets, to the inside edge of the back section 18c and another strap is attached near the edge of the downwardly sloping section.

In the preferred embodiment as shown in FIG. 6 a centered single strap 22 is attached to the cradle 18 and a single centered strap is attached to the seat slipplate 20. The hooks 22b on each strap are hooked to the respective underside structure of the vehicle seat.

Figure 4:
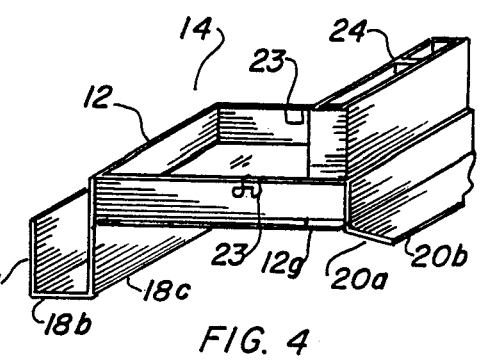
FIG. 4 is back perspective view of the organizer showing the location of the seat slip-plate, a pair of holding clips and a first configuration of the extended vertical container.

Another method that may be employed to hold the organizer in place is by selectively attaching a pair of holding clips 23 to the top edge of the side sections 12a, 12b as shown in FIG. 4. To the clips may then be temporarily attached the seat belt or alternatively, a resilient strap having one of its ends hooked to the clip and its other end to the underside structure of the vehicle seat.

To further enhance the utility of the organizer 10 an extended vertical container 24 may be included with the organizer 10. This container, as shown best in FIGS. 2 and 11, is configured as a rectangular and hollow structure having narrow side sections 24a that are enclosed by a front section 24b and a back section 24c. The width of the container is selected to allow the container to slideably fit inside the tray insert 14 between the side sections 14a, 14b of the tray 14. The containers thickness is selected to allow the container to be held by a second divider 16b inserted into a set of vertical grooves 14f on the tray 14 that are located near the front section 24b of the container as best shown in FIG. 2.

Figure 9:
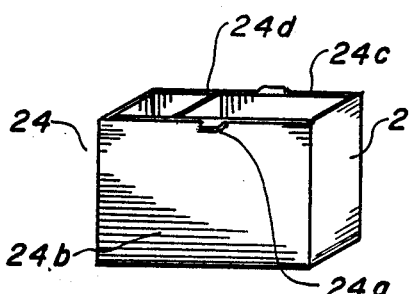
FIG. 9 is a perspective view of an extended vertical container having a divider that divides the container into two sections.
Figure 10:
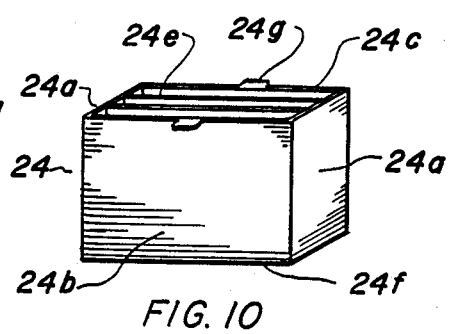
FIG. 10 is a perspective view of an extended vertical container having a plurality of paper dividers that divide the container into several paper slots.

The container 24 may be used as described or it may be designed with a divider 24d that is located between the front and back sections 24b, 24c. This divider 24d allows the container to be partitioned into two trays. As best shown in FIGS. 2 and 9, one of these trays is wide enough to house an article such as a bound map book. Alternatively, the container may be designed with a plurality of paper dividers 24e located between the side sections 24a as shown in FIG. 10. These dividers partition the container into a set of lengthwise narrow trays suitable for holding a variety of often used forms and the like.

The extended vertical container 24 may also be made with a bottom section 24f and a lift tab 24g located on the upper edge of the front section 24b and the back section 24c. These tabs as best shown in FIGS. 9 and 10, allow the now enclosed container to be lifted from the tray insert 14 and carried with its contents to a remote location.

The final element described is the cover/writing table 26. The table consists, as shown in FIG. 11 of a flat area 26a having a pull tab 26b on its inboard end. The pull tab in the preferred embodiment consists of a vertical section that is centered and normal to the flat area 26a and that extends along the edge of the flat area. The flat area is sized to cover the tray insert area bounded by the tray's front section 14c, a second divider 16b inserted into the insert near the containers 24 front section 24b and the corresponding length of the trays side sections 14a, 14b. Support for the table is also provided by the top of dividers inserted into the tray insert 14.

As the title implies, the table serves as both a cover to reduce dust contamination and to provide a large writing surface. If desired a resilient band can be wrapped around the table to allow papers, forms and maps etc. to be held in place while the vehicle is moving.

When the cover/writing table 26 is not being used, it can be easily and conveniently stowed by inserting the table into the longitudinal slot 12g located on the side of the tray 12.

While the invention has been described in complete detail and pictorially shown in the accompanying drawings it is not to be limited to such details, since many changes and modifications may be made to the invention without departing from the spirit and the scope thereof. For example, rather than having a basic rectangular configuration, the organizer 10 could be made with seat contoured, round cornered sections. Additionally, other useful implements could be added: a spring clip can be easily attached to many of the organizers 10 elements to allow various forms maps etc. to be held in place; or the handle on the cover/writing table 26 can be in a closedend U-shape to hold pens, pencils and other narrow items. Hence, it is described to cover any and all modifications and forms which may come within the language and scope of the claims.

I claim:

1. A vehicle portable-office organizer comprising:
   (a) a rectangular tray having an inboard side section, an outboard side section, a front section having outer sides, a back section having outer sides, and a bottom section where the height of the side sections is slightly less than the height of the front and back section and where the top perimeter dimension of said tray is selected to allow said tray to fit within the top of a vehicle seat,
   (b) a rectangular tray insert having an inboard side section, an outboard side section, a front section, a back section each with upper edges, and a bottom section with each of the side sections and the back and front sections each having on their inside surface a plurality of vertical grooves and where the top perimeter dimension of said insert allows said insert to slideably fit inside of said tray,
   (c) a divider set consisting of a plurality of dividers one of which is a contiguous divider having a plurality of vertical grooves on each side and where said dividers are sized to fit into the vertical grooves on said tray insert and said contiguous divider allowing said insert to be divided into a selectable quantity of individual smaller trays, and
   (d) a cradle having outer sides, a front section, a bottom section and a back section, said cradle attached to the outer side of the front section of said tray by an attachment means, said cradle is in a J-shape when viewed from its side.

2. A vehicle portable-office organizer comprising:
   (a) a rectangular tray having an inboard side section, an outboard side section, a front section having outer sides, a back section having outer sides and a bottom section where the height of the side sections is slightly less than the height of the front and back section and where the top perimeter dimension of said tray is selected to allow said tray to fit within the top of a vehicle seat,
   (b) a rectangular tray insert having an inboard side section, an outboard side section, a front section, a back section, each with upper edges, and a bottom section with each of the side sections and the back and front sections each having on their inside surface a plurality of vertical grooves and where the top perimeter dimension of said insert allows said insert to slideably fit inside of said tray, said tray has an inboard side section having a longitudinal slot that extends along a lower edge of the inboard section and a seat belt slot that is located near a lower back corner of its outboard side section,
   (c) a divider set consisting of a plurality of dividers one of which is a contiguous divider having a plurality of vertical grooves on each contiguous side and where said dividers on said tray insert and said contiguous divider allowing said insert to be divided into a selectable quantity of individual smaller trays, and
   (d) a cradle having outer sides and a front section, a bottom section and a back section, said cradle attached to the outer side of the front section of said tray by an attachment means.

3. A vehicle portable-office organizer comprising:
   (a) a rectangular tray having an inboard side section, an outboard side section, a front section having outer sides, a back section having outer sides and a bottom section where the height of the side section is slightly less than the height of the front and back section and where the top perimeter dimension of said tray is selected to allow said tray to fit within the top of a vehicle seat,
   (b) a rectangular tray insert having an inboard side section, an outboard side section, a front section, a back section each with upper edges, and a bottom section with each of the side sections and the back and front sections each having on their inside surface a plurality of vertical grooves and where the top perimeter dimension of said insert allows said insert to slideably fit inside of said tray,
   (c) a divider set consisting of a plurality of dividers one of which is a contiguous divider having a plurality of vertical grooves on each side and where said dividiers are sized to fit into the vertical grooves on said tray insert and said contiguous divider allowing said insert to be divided into a selectable quantity of individual smaller trays,
   (d) a cradle having outer sides a front section, a bottom section and a back section, said cradle attached to the outer side of the front section of said tray by an attachment means, and
   (e) a tray overlay having a set of cup bores where said overlay is sized to fit over said tray insert.

4. A vehicle portable-office organizer comprising:
   (a) a rectangular tray having an inboard side section, an outboard side section, a front section having outer sides, a back section having outer sides and a bottom section where the height of the side sections is slightly less than the height of the front and back section and where the top perimeter dimension of said tray is selected to allow said tray to fit within the top of a vehicle seat, (b) a rectangular tray insert having an inboard side section, an outboard side section, a front section, a back section each with upper edges, and a bottom section with each of the side sections and the back and front section each having on their inside surface a plurality of vertical grooves and where the top perimeter dimension of said insert allows said insert to slideably fit inside of said tray, (c) a divider set consisting of a plurality of dividers one of which is a contiguous divider having a plurality of vertical grooves on each side and where said dividers are sized to fit into the vertical grooves on said tray insert and said contiguous divider allowing said insert to be divided into a selectable quantity of individual smaller trays, and (d) a cradle having outer sides, a front section, a bottom section and a back section, said cradle attached to the outer side of the front section of said tray by an attachment means, (e) a seat slip-plate having a vertical section and a downwardly sloping section contiguous with the vertical section where the outer side of the vertical section is attached to the outer side of the tray back section by an attachment means, and (f) pair of resilient organizer attachment straps having a first and a second end, a hook is attached to said first end of the straps and said second end of one of the straps is attached to said cradle and the second end of the other strap is attached to said seat slip-plate and where the hooks on each of the straps are hooked to said vehicle to allow said organizer to be further held in place.

* * * * *